June 11, 1968  G. W. POWELL  3,387,410
CONTINUOUS CLEANING APPARATUS
Filed Nov. 18, 1966  2 Sheets-Sheet 1
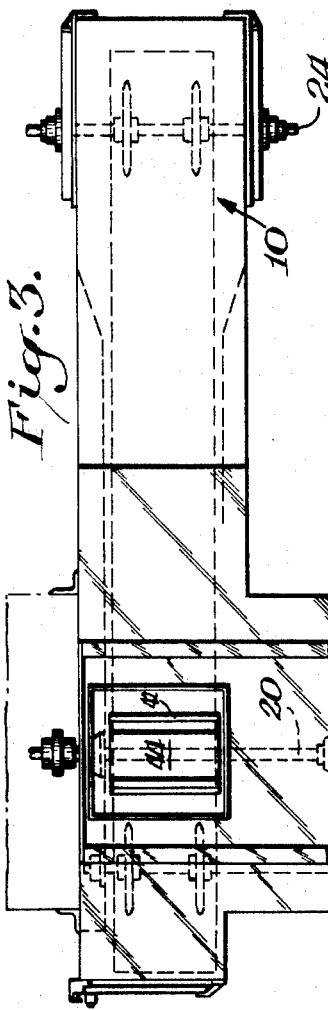
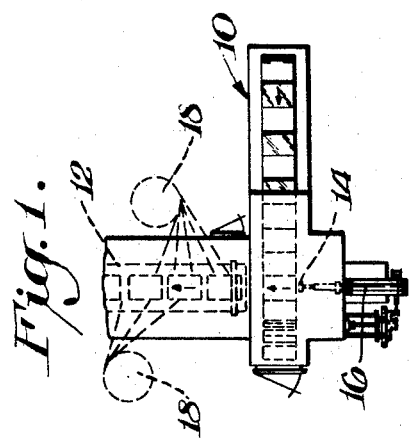
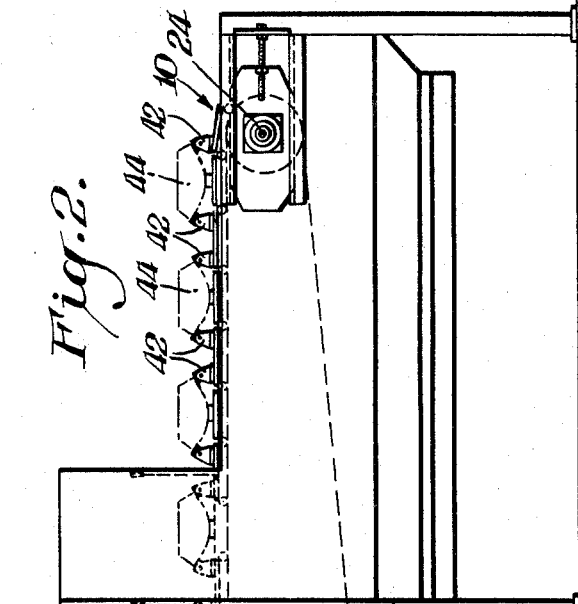
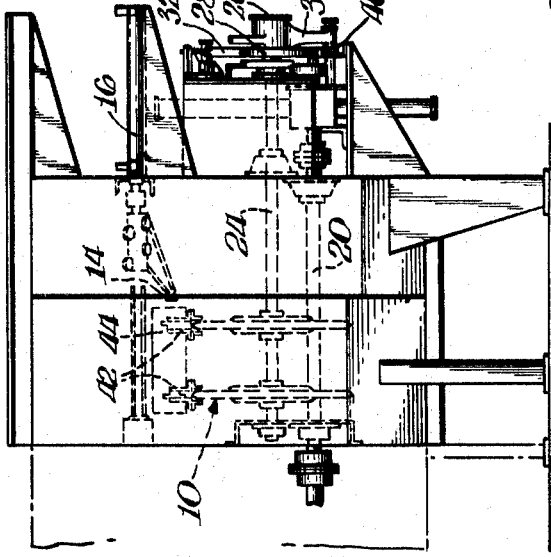

United States Patent Office 3,387,410
Patented June 11, 1968

3,387,410
CONTINUOUS CLEANING APPARATUS
George W. Powell, Hagerstown, Md., assignor to The Pangborn Corporation, Hagerstown, Md., a corporation of Delaware
Filed Nov. 18, 1966, Ser. No. 595,426
10 Claims. (Cl. 51—15)

ABSTRACT OF THE DISCLOSURE

A continuous cleaning apparatus includes an axial flow barrel which is alternatively rotated both clockwise and counterclockwise at the end of each revolution, a conveyor moves articles to be cleaned toward the barrel and it is driven by the same drive mechanism for the barrel in such a manner that the conveyor moves in only one direction regardless of the direction of movement of the barrel.

---

This invention relates to an apparatus which is particularly suitable for cleaning large batches of parts or continuously fed parts, such as automobile heads, manifolds, etc.

Copending application Ser. No. 553,183, filed May 26, 1966, and its continuation-in-part application Ser. No. 592,799, filed Nov. 8, 1966 relate to advantageous apparatus which includes an axial flow barrel capable of high production cleaning. The apparatus in, for example Ser. No. 553,183 utilizes a positive mechanical interlock between the flow barrel and the feed conveyor which is arranged at right angles thereto. In the apparatus of both of the aforesaid patent applications, the barrel rotates in only one direction. For some parts it is impractical to rotate the barrel continuously because of problems relating to the loading of a constantly rotating barrel. Thus for complicated parts it is necessary to stop the barrel in a given position so that the parts can be accurately inserted therein. Better stopping control, better blast application and better parts drainage can be obtained if the rotation is reversed after each stop. Although the reversal of rotation is highly desirable, a problem exists with the above type apparatus in mechanically interlocking the right angle index conveyor to the barrel and reverse its direction after each stop. For example with a normal type connection if the barrel direction is reversed, the conveyor direction would be also reversed which would completely frustrate the loading procedures.

An object of this invention is to provide a continuous cleaning apparatus of the above type wherein the barrel alternates or reverses its direction of rotation.

In accordance with this invention the barrel and conveyor are interlocked in such a manner that the direction of rotation of the barrel is continuously reversed or alternated after each revolution while the direction of movement of the conveyor remains the same. This can be accomplished by, for example, an index wheel mounted on the conveyor drive shaft. The index wheel may include a pair of locking pawls which permits the index wheel to rotate in only one direction. The drive shaft for the conveyor and the drive shaft for the barrel are interconnected by a reciprocating linkage. This linkage includes a drive pawl mounted against the notched surface of the index wheel so that the index wheel is rotated whenever the barrel rotates regardless of the direction of rotation of the barrel. The conveyor may include spacers or pusher fingers for holding the parts to be cleaned. These spacers are arranged with respect to the notches in the index wheel so that one revolution of the barrel causes a predetermined amount of revolution of the index wheel which in turn corresponds to the movement of one part on the conveyor toward the barrel opening so that the part can be loaded into the barrel by automatic loading means such as a ram mounted on the end of a piston cylinder assembly.

Novel features and advantages of the present invention will be more apparent from a reading of the following description in conjunction with the accompanying drawings wherein like reference characters refer to like parts and in which:

FIGURE 1 is a plan view of one embodiment of this invention;

FIGURE 2 is a front elevational view of the embodiment of the invention shown in FIGURE 1;

FIGURES 3 and 4 are plan and end views respectively of the embodiment of the invention shown in FIGURE 2.

Figure 5:
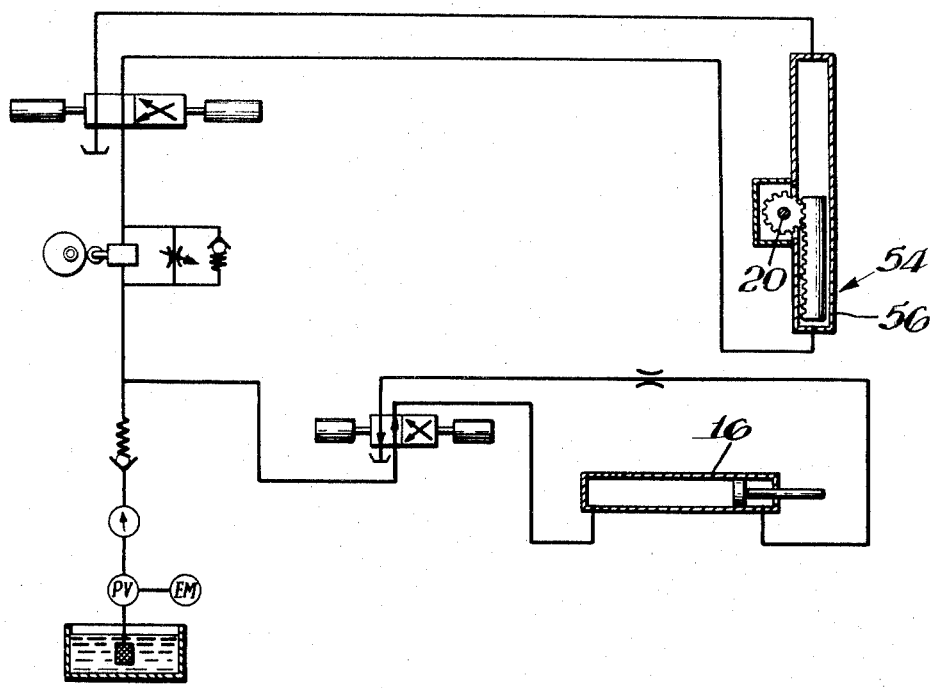
FIGURE 5 is a schematic showing of a hydraulic system of this invention.

As shown in FIGURE 1, the parts are fed by conveyor 10 which is disposed at right angles to axial flow barrel 12. A suitable loading mechanism such as ram 14 mounted on the end of piston cylinder assembly 16 loads each part into flow barrel 12 where it is cleaned by, for example suitably arranged blast wheels 18. This device as thus described is similar to that shown and described in copending application Ser. No. 553,183, filed May 26, 1966.

Barrel 12 is driven by, for example hydraulic rotary actuator and gear means. Since the specific drive means may be of the type described in detail in copending application Ser. No. 553,183 its description in the present application is merely briefly referred to hereinafter for the sake of clarity. It is noted, however, that the hydraulic drive may be interconnected with piston cylinder assembly 16 to assure proper cooperation between the loading of the parts into the barrel and the stopping of rotation of the barrel.

Drive shaft 20 is driven in such a manner that its direction of movement reverses at the end of each revolution. Shaft 20 may have, for example a gear 22 (FIG. 2) mounted thereon which transmits this movement to barrel 12. As shown in FIG. 2 conveyor 10 is for example a chain conveyor which is driven over a pair of shafts 24, 26. Shaft 26 acts as the drive shaft for conveyor 10. An index wheel 28 is mounted near the end of shaft 26. Wheel 28 is connected to shaft 20 through reciprocating linkage 30 (later described) in such a manner that the rotation of shaft 20 is transmitted to shaft 26 so that shaft 26 rotates in only one direction, for example the counter clockwise direction indicated in FIG. 2, regardless of the direction of rotation of shaft 20. Accordingly, the same drive for causing barrel 12 to reverse its direction of rotation at the end of each revolution of the barrel is utilized to drive conveyor 10 in only one direction.

FIG. 5 shows the hydraulic system for operating the device. As indicated therein the drive shaft 20 is reciprocated by means of rotary actuation 54 having a hydraulic piston cylinder arrangement 56 which is geared, for example to a gear on shaft 20. As also shown in FIG. 5, piston cylinder assembly 56 is hydraulically interconnected with piston cylinder 16. This arrangement is essentially the same as that shown in FIGURE 10 of copending application Ser. No. 553,183.

As best shown in FIGS. 2 and 3, a pair of locking pawls 32 engage the notched surface of index wheel 28. The pawls 32 are shaped in such a manner with respect to the notches in index wheel 28 that the pawls 32 prevent wheel 28 from rotating in a clockwise direction. Wheel 28, however, can rotate counterclockwise whereupon the pawls slip out of the notches and fall into the succeeding notches.

FIGURES 2 and 3 also show the details of reciprocating linkage 30. As indicated therein an arm 34 is mounted on the end of shaft 20. Arm 34 thereby rotates in the same direction as shaft 20. A connecting link 36 is pivotably mounted at one end to arm 34. Thus as arm 34 rotates, link 36 is moved to and fro as indicated in FIG. 2. Link 36 is pivotably secured at its other end to arm pickup member 38. A drive pawl 40 is also secured to arm pickup 38 and urged against the notched surface of index wheel 28. As arm 34 is rotated by shaft 20, arm 34 carries link 36 and arm pickup 38 along with it which in turn causes pawl 40 engaged in one of the notches of index wheel 28 to rotate the index wheel. These various members of reciprocating linkage 30 are thus arranged so that the alternating direction of movement of shaft 20 is transmitted to shaft 26 to rotate shaft 26 in only one direction.

As indicated in FIG. 2 conveyor 10 includes a number of spacing devices such as fixtures or pusher fingers 42 for holding the articles 44 to be cleaned. Advantageously, index wheel 28 is provided with four notches 46 disposed 90° apart. The notches are arranged in such a manner with respect to pusher fingers 42 that every 90° of rotation of wheel 28 takes place while a different set of pusher fingers 42 is disposed in front of barrel 12. The rotation of barrel 12 and index wheel 28 and the location of pusher fingers 42 is synchronized with respect to ram 14 that at the end of each revolution of barrel 12 a different work piece 44 is loaded into the barrel 12.

It is noted that with devices that are mechanically interlocked with a continuously rotating barrel, the feed conveyor is continuously moving. This set up makes it difficult to incorporate automatic loading since the fixture is never stopped. The apparatus of this invention, however, overcomes this objectionable feature. For example, with the type of drive indicated, the index conveyor loading fixture is stationary for approximately one-half of the barrel rotation in addition to the time required to push the work piece into the barrel. This accordingly, gives ample time to load the stopped fixture either automatically or manually. For example if the cycle is four seconds, with three seconds required for rotation, one second required for the ramming, the load station would be stopped for 3/2+1 or 2.5 seconds.

A further advantage with the apparatus of this invention is that the movement from station to station is smooth yet rapid. This is enhanced by arranging the arm pickup 38 and pawl 40 with respect to notches 46 in such a way that at the beginning of the 90° movement of wheel 28, arm pickup 38 is rotating downwardly or accelerating and at the end of the 90° movement arm pickup 38 is rotating upwardly or decelerating. This might best be understood by reference to FIG. 2. As indicated therein an imaginary radius 48 is shown in dash lines. The end of this radius corresponds to the lowest point of wheel 28. At the beginning of a 90° rotation of wheel 28, arm pickup 38 is to the left side or above the imaginary radius 48. During the beginning of the 90° rotation, arm pickup 38 rotates toward the imaginary radius 48 in a downward direction which would cause the pawl 40 to accelerate the movement of index wheel 28 and thus also the movement of index conveyor 10. Toward the end of the 90° rotation, however, arm pickup 38 is to the right hand side of imaginary radius 48 or moving upwardly. Thus pawl 40 causes the speed of rotation of index wheel 28 to decelerate to thereby also decelerate the movement of index conveyor 10. This acceleration and deceleration is accomplished uniformly from start to stop.

Although the invention is illustrated in its preferred form as being in combination with an axial flow barrel, the invention may also be practiced in situations where a single drive is utilized to rotate one device in alternating or reversed directions while rotating another device in a single direction.

Obviously many modifications and variations of the invention are possible in light of the above teachings. It is, therefore, to be understood that within the scope of the appended claims, the invention may be practiced otherwise than specifically described.

What is claimed is:

1. A continuous cleaning apparatus comprising an axial flow barrel, conveyor means disposed at right angles to said flow barrel for disposing the articles to be cleaned in the front of said barrel, load means for removing the articles from said conveyor means and inserting the articles into said barrel, drive means for rotating said barrel in opposite directions, drive means for moving said conveyor means, and connecting means between said barrel drive means and said conveyor drive means for moving said conveyor means in only one direction regardless of the direction of movement of said barrel.

2. An apparatus as set forth in claim 1 wherein said conveyor drive means includes a drive shaft, a notched index wheel on said drive shaft, a drive pawl mounted against said index wheel, said barrel drive means including a main drive shaft, and said connecting means including a reciprocating linkage connected between said main drive shaft and said drive pawl.

3. An apparatus as set forth in claim 2 wherein locking pawl means are mounted against said index wheel for permitting said index wheel to rotate in one direction and preventing it from rotating in the opposite direction.

4. An apparatus as set forth in claim 3 wherein said reciprocating linkage includes a rotatable arm mounted on said main drive shaft, a reciprocating link member pivotably connected at one end to said rotatable arm, an arm pickup rotatably mounted on said conveyor drive shaft, said reciprocating link being secured at its other end to the end of said arm pickup, and said drive pawl being connected to said end of said arm pickup.

5. An apparatus as set forth in claim 4 wherein said notched index wheel includes four notches spaced 90° apart whereby rotation of said barrel one revolution causes said index wheel to be rotated 90°.

6. An apparatus as set forth in claim 5 wherein said index wheel includes a lower most portion, and said arm pickup being mounted for moving toward and away from said most lower portion during said 90° movement of said index wheel whereby said index wheel accelerates at the beginning of its movement and decelerates at the end of its movement.

7. An apparatus as set forth in claim 6 wherein said conveyor means includes a chain conveyor, spacing means being on said chain conveyor for holding the articles to be cleaned, and said spacing means being arranged with respect to said index wheel whereby each 90° movement of said index wheel causes a different article to be disposed in front of said barrel.

8. An apparatus as set forth in claim 7 including blast means for directing blastant particles against the articles as they flow through said barrel.

9. An apparatus as set forth in claim 1 including cleaning means for directing cleaning media against the articles as they flow through said barrel.

10. A rotating assembly comprising a first rotating member, a second rotating member, drive means for rotating said first member in reverse directions at the end of each revolution of said first rotating member, said drive means including a main drive shaft, a drive shaft for said second rotating member, connecting means between said main drive shaft and said drive shaft for said second rotating member for rotating said second member in only one direction regardless of the direction of rotation of said first member, said connecting means including an arm rotatably mounted on said main drive shaft, a reciprocating link pivotably mounted at one end to the end of said arm, a notched index wheel on said second member drive shaft for rotating said second member drive shaft, a drive pawl mounted against said index wheel, an arm pickup mounted on said second member drive shaft, and the end of said arm pickup being secured to said drive pawl and to said reciprocating link.

References Cited

UNITED STATES PATENTS

| | | | |
|---|---|---|---|
| 2,161,469 | 6/1939 | Holm | 198—24 |
| 2,176,381 | 10/1939 | Shaw | 74—116 |
| 2,507,291 | 5/1950 | Wright | 259—14 |
| 2,901,084 | 8/1959 | Engleson | 198—24 |

FOREIGN PATENTS

| | | |
|---|---|---|
| 809,363 | 7/1951 | Germany. |
| 935,087 | 8/1963 | Great Britain. |

RICHARD E. AEGERTER, *Primary Examiner.*